Sept. 4, 1923.                                                          1,467,272
C. B. HAZLEHURST
BROILING SKILLET
Filed Oct. 26, 1922
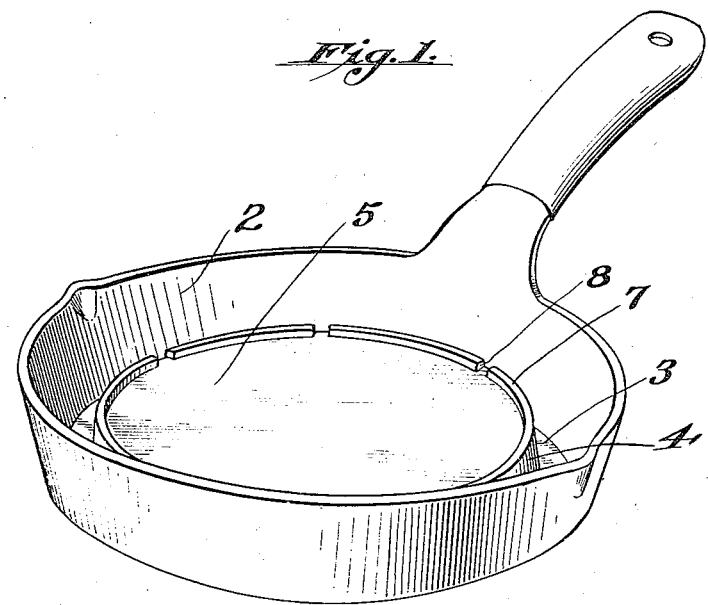
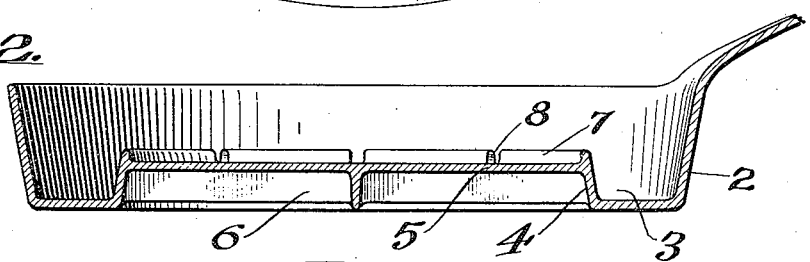
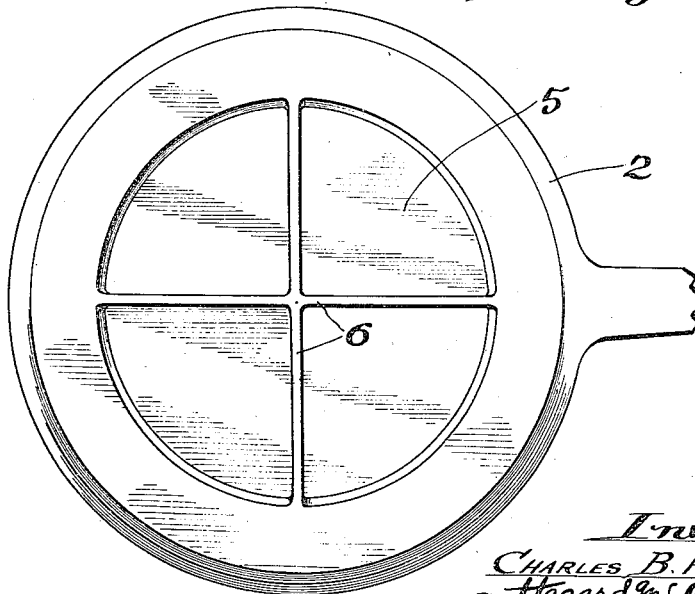
Inventor:
CHARLES B. HAZLEHURST
By Hazard and Miller
Attorneys Patented Sept. 4, 1923.

1,467,272

UNITED STATES PATENT OFFICE.

CHARLES B. HAZLEHURST, OF PASADENA, CALIFORNIA.

BROILING SKILLET.

Application filed October 26, 1922. Serial No. 597,019.

*To all whom it may concern:*

Be it known that I, CHARLES B. HAZLEHURST, a citizen of the United States, residing at Pasadena, in the county of Los Angeles and State of California, have invented new and useful Improvements in Broiling Skillets, of which the following is a specification.

This invention relates to cooking utensils, and more particularly to frying pans.

It is an object of the present invention to provide a simple, practicable and substantial skillet that may be effectively utilized for frying and for broiling. It is another object of the invention to provide a skillet having means for collecting and uniformly disseminating heat from a burner. Another object is to provide a skillet having a grease catching trough of such size as to receive an ordinary spoon whereby the grease or gravy may be gathered and conveniently returned to the frying zone or portion of the skillet, or may be readily drained away from the skillet.

Another object is to provide a skillet having a frying bottom, which preferably is elevated above a surrounding portion and which is provided with means for retaining substance that is being cooked upon the elevated frying bottom area, and to provide means for permitting the escape of juices and greases from the frying bottom.

Other objects and advantages will be made manifest in the following specification of an embodiment of the invention illustrated in the accompanying drawings, wherein Figure 1 is a perspective of the improved broiling skillet.

Fig. 2 is a transverse section.

Fig. 3 is a plan, the handle being omitted.

The broiling skillet of the present invention comprises an upstanding wall 2, preferably of circular form and this joins at its lower portion with an annular trough or gutter 3 having an upstanding inner wall 4. The inner wall is endless and is preferably circular and supports the cooking or frying area or "bottom" 5 which is raised somewhat above the bottom of the trough 3, and therefore forms a concavity in the bottom of the pan or skillet. This concavity serves as means wherein the heat of combustion of a contiguous zone of fire, or other source of heat, is efficiently conducted and economically utilized. To further utilize and distribute the heat, the bottom 5 may be provided with heat conducting downwardly extending ribs or webs 6.

A feature of the invention consists of a shallow marginal bead surrounding the outer edge of the bottom 5 and this bead is shown as formed of segments of annuli 7, the contiguous ends of which are slightly spaced as at 8 to provide small outlet apertures for juices or greases, or other fluid that may be produced or made during use of the pan while cooking substance placed on the bottom 5.

From the above it will be seen that small pieces for instance, slices of bacon can be effectively cooked on the elevated bottom 5 and the fats coming from the cooking of the bacon may constantly drain out through the escape apertures 8 and collect in the trough or surrounding gutter 3.

In some cases it may be desirable to collect the greases or fluids from the trough 3 and pour the same back over the substance being cooked or to otherwise dispose of the fluids. This can be readily accomplished by the insertion of a spoon into the trough 3 to gather the collected liquid therein.

Further embodiments, modifications and changes may be resorted to within the spirit of the invention as here claimed.

What is claimed is:

A frying pan having a bottom with a plane, annular, marginal portion with an outer, upturned wall, said bottom having an upraised, central bottom plate having a substantially plane top surface and being connected to the annular bottom wall by a continuous web; the circumference of the raised plate having an upstanding, marginal, interrupted bead provided with an inner face which is substantially perpendicular to the top plane of said plate, whereby to form an abrupt retaining shoulder to prevent substances, being cooked upon the plate, from shifting laterally off of the said plate; the interrupted bead providing for the escape of liquids from the top of the plate.

In testimony whereof I have signed my name to this specification.

CHARLES B. HAZLEHURST.